United States Patent
Pantalone, III et al.

(10) Patent No.: US 10,273,018 B2
(45) Date of Patent: Apr. 30, 2019

(54) UPTURNED EXHAUST SYSTEM FOR ROTARY WING AIRCRAFT

(71) Applicant: Sikorsky Aircraft Corporation, Stratford, CT (US)

(72) Inventors: Joseph Pantalone, III, Guilford, CT (US); John S. Chapkovich, III, Derby, CT (US); Ashley DeVito, Newtown, CT (US); Brandon L. Stille, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1287 days.

(21) Appl. No.: 14/049,535

(22) Filed: Oct. 9, 2013

(65) Prior Publication Data
US 2014/0096501 A1    Apr. 10, 2014

Related U.S. Application Data

(60) Provisional application No. 61/711,902, filed on Oct. 10, 2012.

(51) Int. Cl.
| | | |
|---|---|---|
| *B64D 33/04* | (2006.01) | |
| *B64C 27/04* | (2006.01) | |
| *B64C 27/10* | (2006.01) | |
| *B64C 27/82* | (2006.01) | |

(52) U.S. Cl.
CPC .............. *B64D 33/04* (2013.01); *B64C 27/04* (2013.01); *B64C 27/10* (2013.01); *B64C 2027/8236* (2013.01); *B64D 2033/045* (2013.01)

(58) Field of Classification Search
CPC ... B64D 33/04; B64D 2033/045; F02K 1/825; F02K 1/822; F02K 1/82
See application file for complete search history.

(56) References Cited

U.S. PATENT DOCUMENTS

| | | | | |
|---|---|---|---|---|
| 4,007,587 | A | * | 2/1977 | Banthin ................. B64D 33/04 239/127.3 |
| 4,095,417 | A | * | 6/1978 | Banthin .................. F02K 1/825 239/127.3 |
| 4,312,480 | A | * | 1/1982 | Miller .................... B64D 33/04 239/127.3 |
| 4,643,606 | A | | 2/1987 | Buchner |
| 5,286,167 | A | | 2/1994 | Byrnes et al. |
| 5,699,965 | A | * | 12/1997 | Amelio .................. B64D 33/04 239/127.3 |
| 5,992,140 | A | | 11/1999 | Hammond et al. |
| 6,016,651 | A | | 1/2000 | Hammond et al. |
| 6,055,804 | A | | 5/2000 | Hammond et al. |
| 6,122,907 | A | | 9/2000 | Frawley |
| 6,134,879 | A | * | 10/2000 | Frawley ................. B64D 33/04 239/127.3 |
| 6,971,240 | B2 | * | 12/2005 | Wollenweber ......... B64D 33/04 239/265.19 |
| 7,188,802 | B2 | | 3/2007 | Magre |

(Continued)

*Primary Examiner* — Philip J Bonzell
(74) *Attorney, Agent, or Firm* — Cantor Colburn LLP (57) ABSTRACT

An exhaust system for reducing infrared emissions of a rotary wing aircraft includes a manifold; an opening in the manifold, the opening configured to face upwards and away from the rotary wing aircraft; and a chimney including a wall positioned about the opening, the chimney configured to eject an emission of intermixed secondary air and engine exhaust upwards and away from the rotary wing aircraft.

20 Claims, 11 Drawing Sheets

(56) References Cited

U.S. PATENT DOCUMENTS

| | | |
|---|---|---|
| 7,506,775 B2 | 3/2009 | Hartzell |
| 7,607,306 B2 | 10/2009 | Steyer et al. |
| 7,762,057 B2 | 7/2010 | Sloan et al. |
| 7,823,375 B2 * | 11/2010 | Zack ..................... B64D 33/04 60/269 |
| 7,836,701 B2 | 11/2010 | Zack et al. |
| 8,069,647 B2 | 12/2011 | Anderson |
| 8,341,934 B2 * | 1/2013 | Chapkovich, III ..... F02K 1/825 60/231 |
| 2009/0025362 A1 | 1/2009 | Chapkovich et al. |

\* cited by examiner

UPTURNED EXHAUST SYSTEM FOR ROTARY WING AIRCRAFT

CROSS-REFERENCE TO RELATED APPLICATIONS

This application claims priority to U.S. provisional application Ser. No. 61/711,902 filed Oct. 10, 2012, the entire contents of which are incorporated herein by reference.

FIELD OF INVENTION

The subject matter disclosed herein relates generally to rotary wing aircraft and, more particularly, to an upturned exhaust system for a rotary wing aircraft. The upturned exhaust system reduces infrared energy from the engine exhaust and reduces engine exhaust impingement on aircraft structure.

DESCRIPTION OF RELATED ART

The exhaust ducting from a gas turbine engine of a rotary wing aircraft is a source of infrared (IR) energy which may be detected by heat seeking missiles and/or various forms of infrared imaging systems for targeting/tracking purposes. With respect to the former, generally speaking, a heat-seeking missile obtains directional cues from the infrared energy generated by the engine exhaust such that the amount of infrared energy given off is one of the primary determining factors of missile accuracy. Regarding the latter, infrared imaging systems detect and amplify the infrared energy for detection and/or targeting.

Current IR suppression systems are utilized on many military aircraft including rotary wing aircraft to provide IR signature reduction. Future IR threats, however, will require even greater levels of IR signature reduction. Generally, IR suppression systems are designed to: (a) reduce the infrared energy below a threshold level of a perceived threat; (b) maintain engine performance; and (c) reduce weight and packaging associated therewith. Other consequences may include: (i) reducing system or configuration complexity to reduce fabrication and maintainability costs; and (ii) reducing the external aerodynamic drag produced by such IR suppressor systems.

Current suppression systems for rotary wing aircraft are primarily designed to provide significant IR signature reduction during a hover flight profile. Generally speaking, current suppressor systems operate by mixing the high temperature exhaust flow with cool airflow supplied by a mixing duct which communicates with an engine exhaust duct. The mixing of large amounts of ambient air with the engine exhaust may significantly reduce the overall gas temperature prior to discharging the engine exhaust overboard, thereby lowering the aircraft IR signature.

It is also desirable to minimize impingement of hot engine exhaust onto adjacent aircraft structure so that the generation of "hot spots" separate from the primary source associated with the nozzle/exhaust plume are avoided. Disadvantageously, the mixing operation may reduce the velocity of the exhaust flow such that the exhaust velocity may be too low to expel the exhaust far enough from the fuselage to avoid such "hot spots." A further disadvantage is that if the exhaust gas does not have enough velocity to escape rotor downwash, the exhaust gas may be re-ingested into the engine which reduces engine efficiency.

BRIEF DESCRIPTION OF THE DRAWINGS

Referring now to the drawings wherein like elements are numbered alike in the several FIGURES.

DETAILED DESCRIPTION

Figure 1:
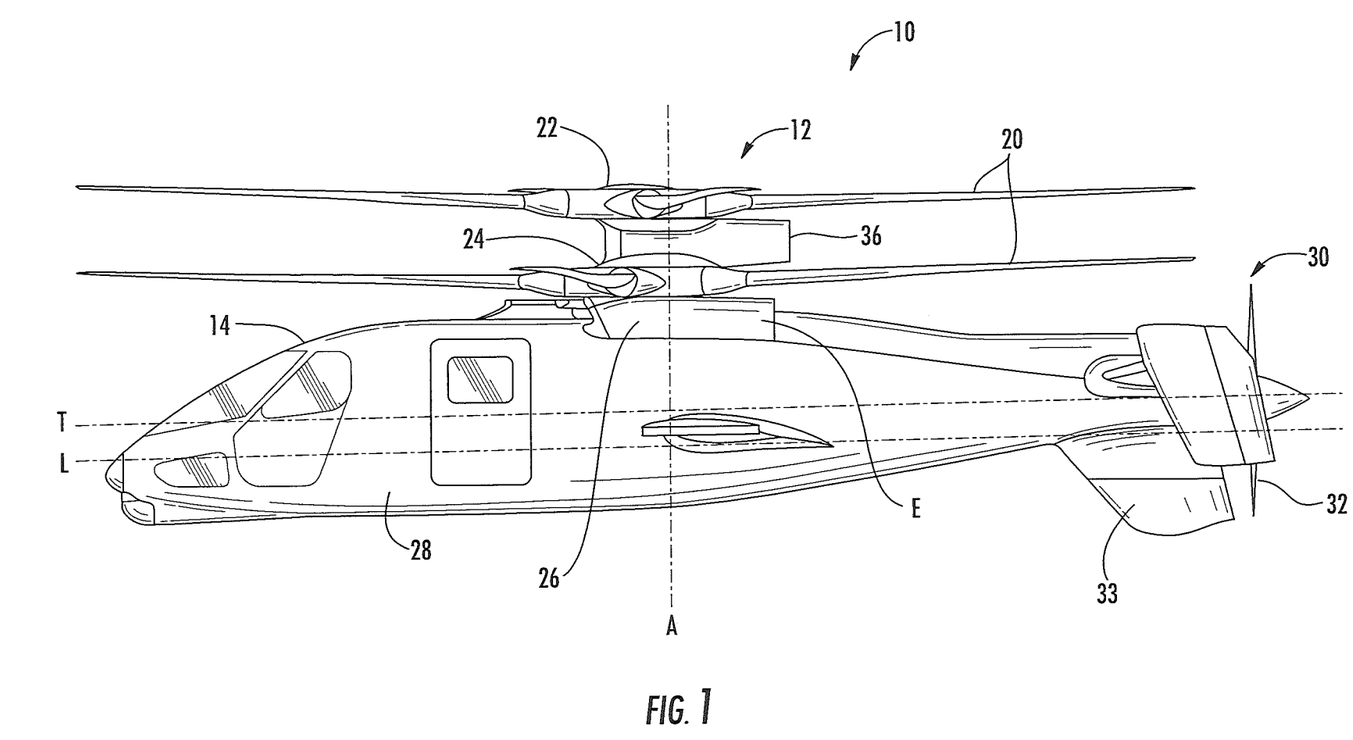
FIG. 1 depicts a rotary wing aircraft in an exemplary embodiment.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis, L. Although a particular aircraft configuration is illustrated in this non-limiting embodiment, other rotary-wing aircraft will also benefit from embodiments of the invention.

The dual, counter-rotating, coaxial rotor system 12 includes an upper rotor system and a lower rotor system. Rotor system 12 includes a plurality of rotor blades 20 mounted to a rotor hub 22, 24 for rotation about rotor axis of rotation A. A plurality of the main rotor blades 20 project substantially radially outward from the hubs 22, 24. Any number of blades 20 may be used with the rotor system 12. The rotor system 12 includes a rotor hub fairing 36 generally located between and around the upper and lower rotor systems such that the rotor hubs 22, 24 are at least partially contained therein. The rotor hub fairing 36 provides drag reduction.

A main gearbox 26 may be located above the aircraft cabin 28 and drives the rotor system 12. The translational thrust system 30 may be driven by the same main gearbox 26 which drives the rotor system 12. The main gearbox 26 is driven by one or more engines (illustrated schematically at E).

The translational thrust system 30 may be mounted to the rear of the airframe 14 with a translational thrust axis, T, oriented substantially horizontal and parallel to the aircraft longitudinal axis L to provide thrust for high-speed flight. The translational thrust system 30 includes a pusher propeller 32 mounted at an aerodynamic tail fairing 33. The translational thrust axis, T, corresponds to the axis of rotation of propeller 32. Although a tail mounted translational thrust system 30 is disclosed in this illustrated non-limiting embodiment, it should be understood that any such system or other translational thrust systems may alternatively or additionally be utilized.

The exhaust system of rotary wing aircraft 10 is designed to manage external engine exhaust impingement to provide use of a composite fuselage, to provide integration with the thrust system 30, to meet aircraft performance requirements and to support compliance with objective platform IR requirements. The exhaust system provides IR signature reduction and manages empennage impingement with advanced mixing technologies.

Figure 2:
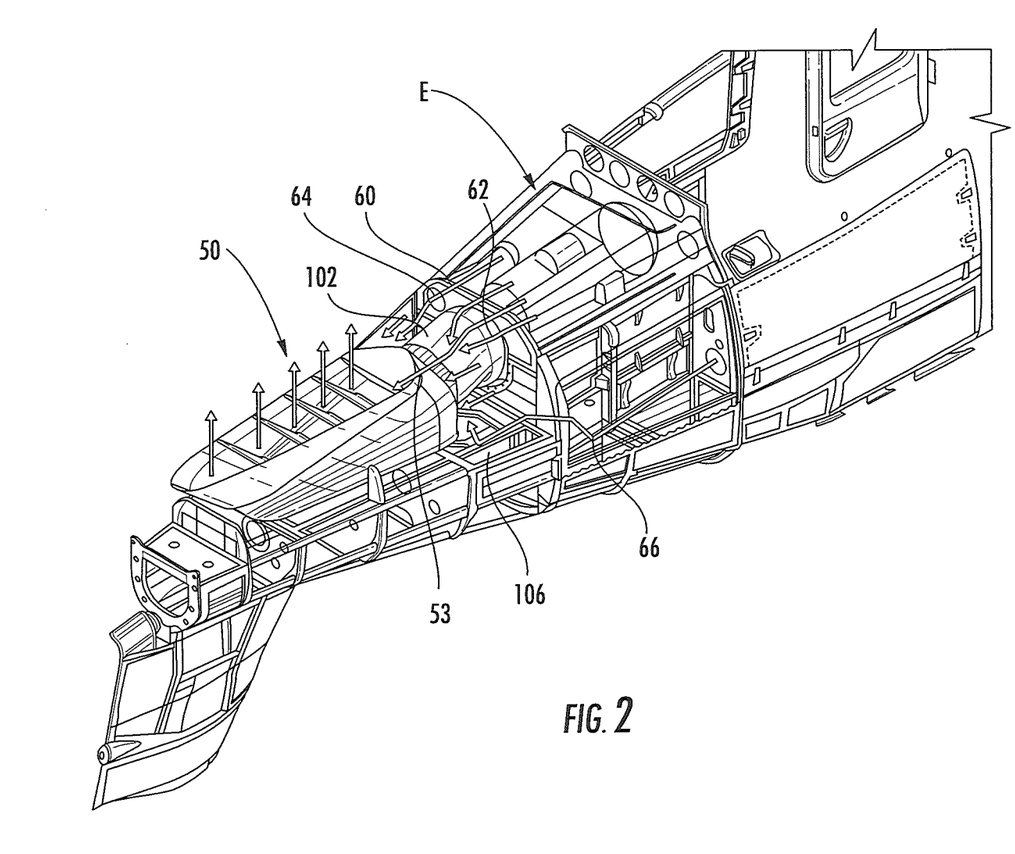
FIG. 2 depicts an exhaust system in an exemplary embodiment.

FIG. 2 depicts an exhaust system 50 employing an internal mixer in an exemplary embodiment. Exhaust system 50 is located to receive exhaust from gas turbine engine E. The exhaust system 50 receives a primary flow of high temperature engine exhaust from the gas turbine engine E. The exhaust system 50 directs the high temperature exhaust gas flow from the aft end of the gas turbine engine E upwardly and/or outwardly, away from observers on the ground. This approach masks a direct view of the IR energy signature from the exhaust system 50, which may otherwise be presented to ground based IR threats. Furthermore, the shape and orientation of the exhaust system 50 reduces exhaust flow impingement onto the airframe 14 which reduces the formation of secondary IR source contributors thereby further reducing the general aircraft thermal signature.

The exhaust system 50 receives secondary air flows from multiple sources to reduce temperature of the emission of the exhaust system 50. A mixer assembly 102 is mounted to firewall 60 and receives exhaust 53 from engine, E, via an opening in firewall 60. Engine compartment cooling air 62 is entrained through an ejector gap between the mixer assembly inlet and firewall 60. An inlet particle separator (IPS) exhaust feed mixing duct 64 in firewall 60 provides a stream of air from the IPS system. Avionics cooling air 66 (from both sides of the aircraft) is fed through firewall 60 by air inlets 106 positioned below mixer assembly 102.

Figure 3:
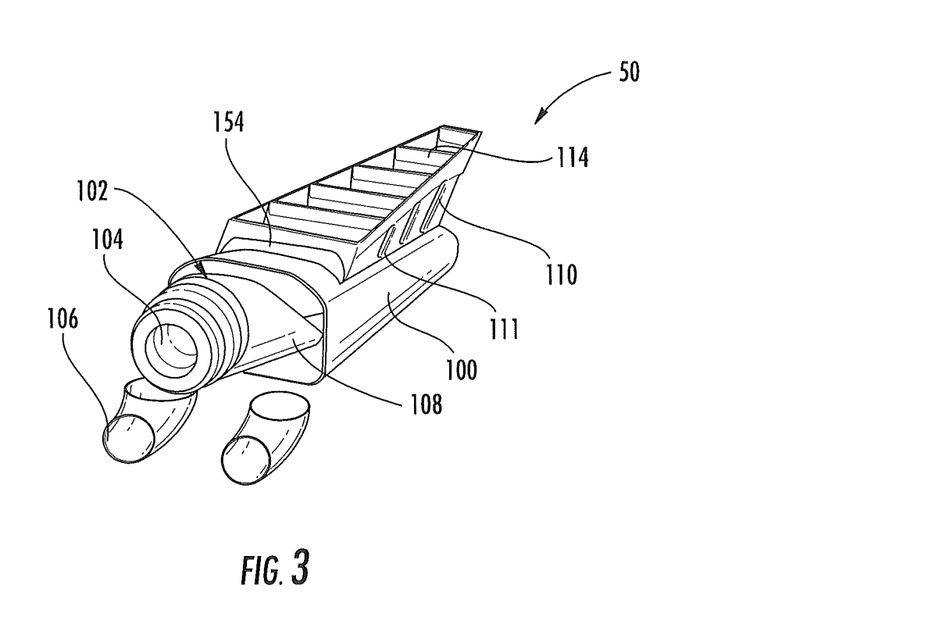
FIG. 3 depicts a single chimney exhaust system with an internal mixer in an exemplary embodiment.

FIG. 3 depicts a single chimney exhaust system 50 in an exemplary embodiment. Exhaust system 50 includes a manifold 100 that receives an exhaust portion of mixer assembly 102. Manifold 100 tapers in height and width from the fore end of manifold 100 to the aft end of manifold 100. The longitudinal axis of manifold 100 is substantially parallel to longitudinal axis L of the aircraft frame 14. Mixer assembly 102 includes an annular exhaust inlet 104 that receives exhaust from engine E.

Mixer assembly 102 includes a lobed mixer 108 positioned at an annular exhaust outlet of the mixer assembly 102. Mixer 108 serves to drive secondary airflows inwards towards the exhaust stream and divert exhaust from exhaust inlet 104 outwards towards the secondary air flows. Secondary air includes the engine compartment cooling air, IPS air and avionics cooling air 66. Other sources of secondary air may be used as described in further detail herein. Mixer 108 intermixes the exhaust and secondary air to dilute and cool the exhaust, which reduce the IR signature of emission of the exhaust system 50.

Figure 4:
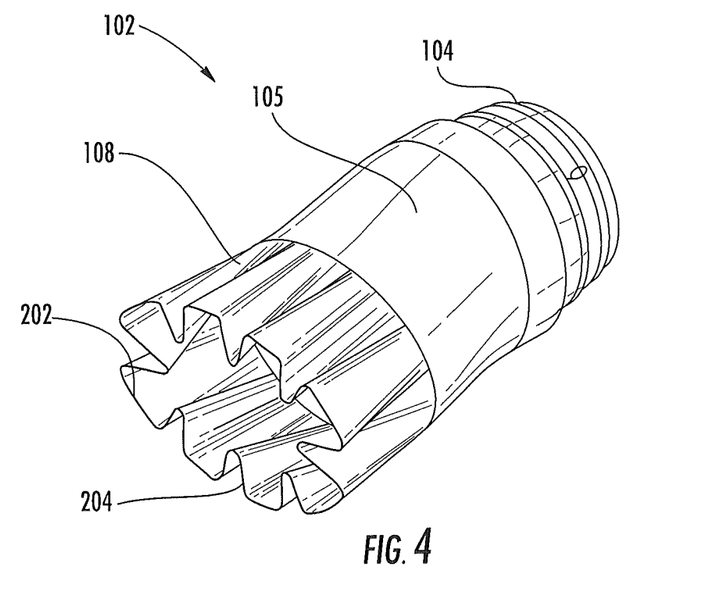
FIG. 4 is a perspective view of an internal mixer assembly in an exemplary embodiment.

FIG. 4 is a perspective view of a mixer assembly 102 in an exemplary embodiment. Mixer assembly 102 includes the annular exhaust inlet 104 at a forward end. A mixer base 105 is annular unit that couples the exhaust inlet 104 to mixer 108. Mixer 108 includes a plurality of lobes 202 and 204. Lobes 202 and 204 extend away from mixer base 105 and are arranged around the circumference of mixer base 105. Lobes 202 are outward lobes and divert exhaust from the interior of mixer 108 towards an exterior of mixer 108. Outward lobes 202 are angled outwards, away from a central axis of mixer 108. Lobes 204 are inward lobes and divert secondary flow from the exterior of mixer 108 towards an interior of mixer 108. Inward lobes 204 are angled inwards, towards a central axis of mixer 108. Outward lobes 202 and inward lobes 204 alternate radially about the circumference of mixer 108.

Figure 5:
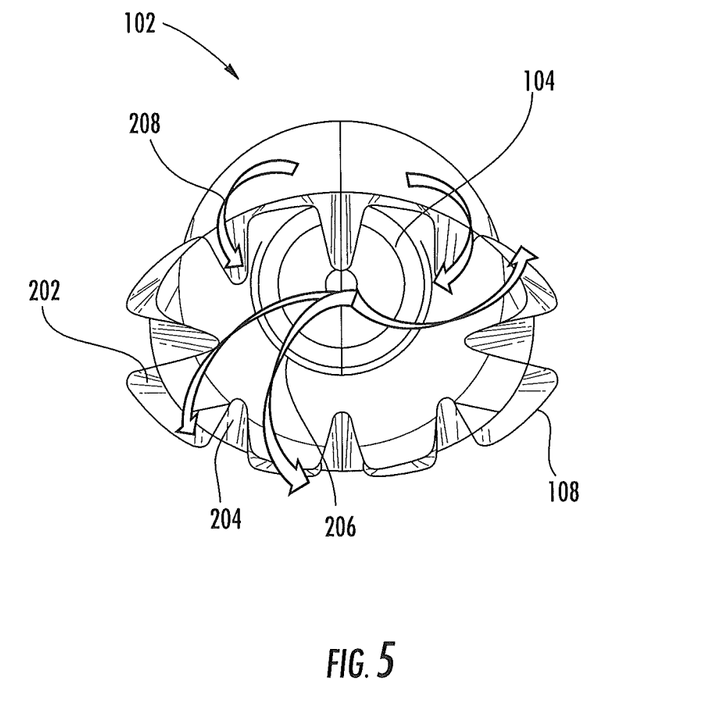
FIG. 5 is a rear view of an internal mixer assembly in an exemplary embodiment.

FIG. 5 is a rear view the mixer assembly 102. As shown in FIG. 5, exhaust 206 from the exhaust inlet 104 is received in an interior of mixer assembly 102. Exhaust 206 from exhaust inlet 104 impinges outward lobes 202 and is diverted radially outwards from the central axis of mixer 108. Secondary air flows 208 (e.g., engine compartment cooling air, IPS air and avionics cooling air) travels over the outside of mixer 108. Secondary air impinges inwards lobes 204 and is diverted radially inwards towards the central axis of mixer 108. This causes the exhaust 206 and secondary air 208 to be mixed, thereby reducing the temperature of the exhaust 206 and the temperature of the emission from the exhaust system 50. The intermixed exhaust 206 and secondary air 208 is ejected from mixer 108 into the interior of manifold 100.

Referring to FIG. 3, the mixed exhaust and secondary air is diverted through chimney 110 in fluid communication with interior of manifold 100. Chimney 110 has walls 111 that circumscribe an opening 112 in a top side of manifold 100. Opening 112 faces upwards, or in the direction of rotor blades 20. Chimney 110 tapers in width from the fore end of chimney 110 to the aft end of chimney 110. Vanes 114 are positioned in chimney 110 between walls 111 and are spaced and angled relative to axis L to direct emissions of the exhaust system away from the aircraft 10. The configuration of the opening 112, chimney 110 and/or vanes 114 direct emissions from the exhaust system upwardly, and generally transverse to aircraft longitudinal axis, L.

Figure 6:
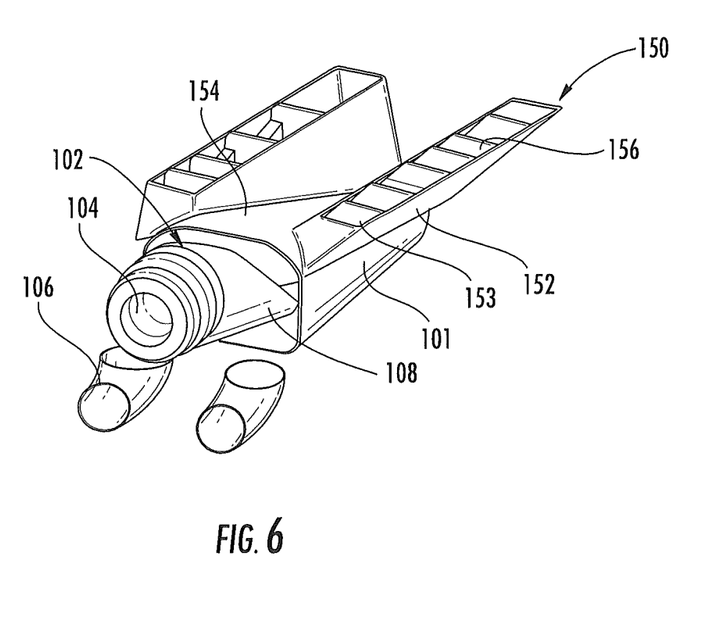
FIG. 6 depicts a dual chimney exhaust system with an internal mixer in an exemplary embodiment.

FIG. 6 depicts a dual chimney exhaust system 150 in an exemplary embodiment. Exhaust system 150 includes a manifold 101, mixer assembly 102, annular exhaust inlet 104, air inlets 106 and mixer 108 as described above with reference to FIG. 3. Manifold 101 has two openings 154 in a top side of manifold 101. Openings 154 face upwards, or in the direction of rotor blades 20. Manifold 101 includes two chimneys 152 having walls 153 that circumscribe openings 154 and in fluid communication with interior of manifold 101. Vanes 156 are positioned in between walls 153 and are spaced and angled relative to axis L to direct emissions of the exhaust system away from the aircraft 10.

Chimneys 152 in FIG. 6 have a larger aspect ratio (i.e., length to width) than chimney 110. The larger aspect ratio provides a more narrow emission stream from each chimney 152 which allows the emissions to dilute in the ambient air more effectively. This enhanced dilution of the exhaust system emissions reduces the IR signature of the aircraft 10. The configuration of the openings 154, chimneys 152 and/or vanes 156 direct emissions from the exhaust system upwardly, and generally transverse to aircraft longitudinal axis, L.

Figure 7:
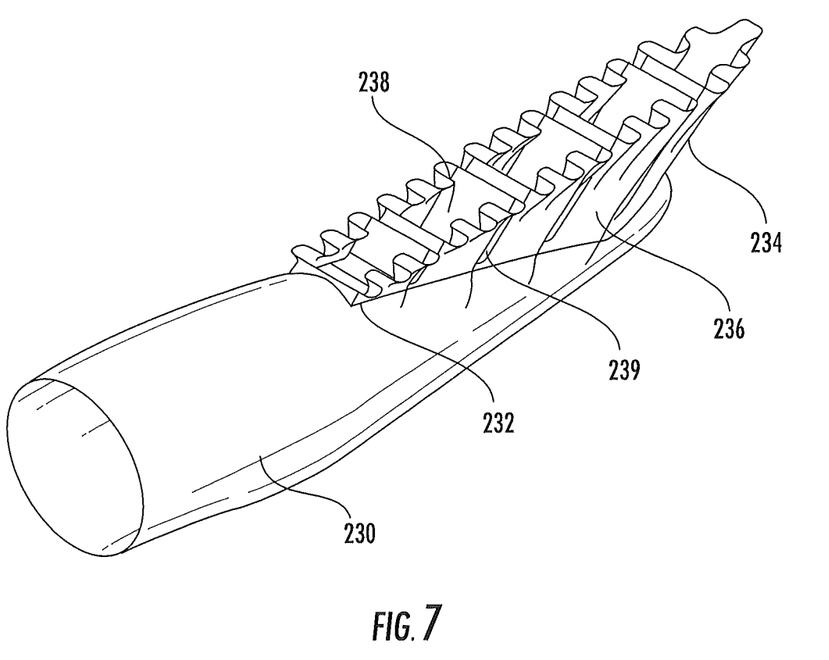
FIG. 7 depicts a single chimney exhaust system in an exemplary embodiment.

FIG. 7 depicts an exhaust manifold 230 in an exemplary embodiment. Exhaust manifold 230 is a generally circular and tapers in diameter from the fore end of manifold 230 to the aft end of manifold 230. The longitudinal axis of manifold 230 is substantially parallel to longitudinal axis L of the aircraft frame 14. Manifold 230 has an opening 232 in a top side of manifold 230. Opening 232 faces upwards, or in the direction of rotor blades 20. Chimney 234 has walls 236 that circumscribe opening 232. Vanes 238 are positioned in between walls 236 and are spaced and angled relative to axis L to direct emissions of the exhaust system away from the aircraft 10. The configuration of the opening 232, chimney 234 and/or vanes 238 direct emissions from the exhaust system upwardly, and generally transverse to aircraft longitudinal axis, L.

Walls 236 of chimney 234 include a lobed exit nozzles, with alternating inward lobes and outward lobes. The outward lobes divert a gas flow from an interior of manifold 230 away from a longitudinal axis of chimney 234. Inward lobes divert secondary air from the exterior of manifold 230 towards a longitudinal axis of chimney 234. Chimney walls 236 also include gaps 239, located between vane locations. Gaps 239 allow secondary air flowing over the outside of manifold 230 to contact a backside of vanes 238 to cool the vanes. The lobed chimney walls 236 with gaps 239 serve as external mixing ejectors that allow for entrainment of cooling air between them through gaps 239. Use of manifold 230 as an external mixer is described in further detail herein with reference to FIG. 10.

Figure 8:
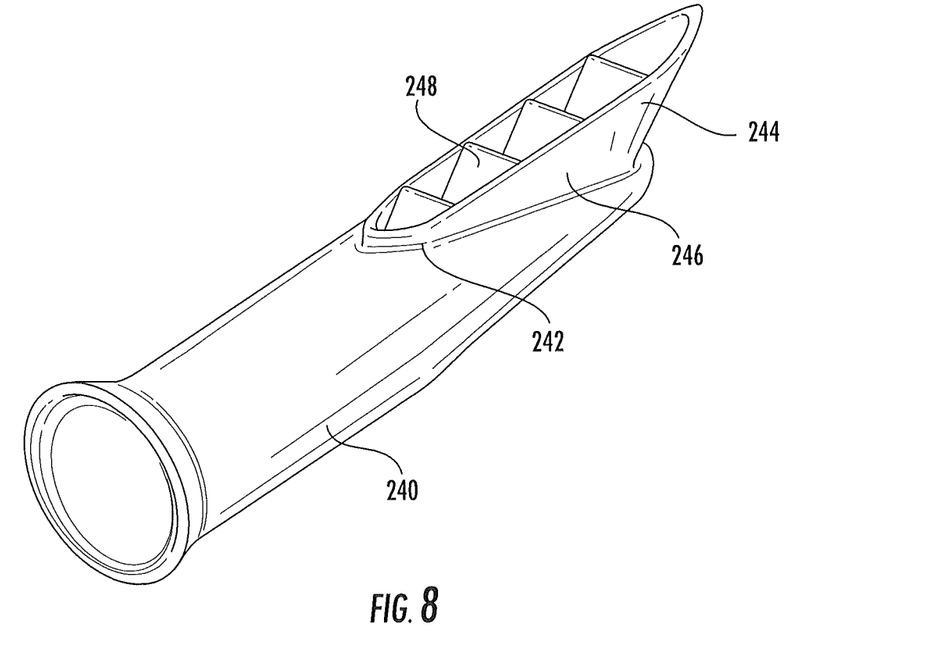
FIG. 8 depicts a single chimney exhaust system in an exemplary embodiment.

FIG. 8 depicts an exhaust manifold 240 in an exemplary embodiment. Exhaust manifold 240 is a generally tubular and tapers in diameter from the fore end of manifold 240 to the aft end of manifold 240. The longitudinal axis of manifold 240 is substantially parallel to longitudinal axis L of the aircraft frame 14. Manifold 240 has an opening 242 in a top side of manifold 240. Opening 242 faces upwards, or in the direction of rotor blades 20. Chimney 244 has walls 246 that circumscribe opening 232. Vanes 248 are positioned in between walls 246 and are spaced and angled relative to axis L to direct emissions of the exhaust system away from the aircraft 10. Chimney 244 is symmetric from fore to aft, having tapered ends both fore and aft. The configuration of the opening 242, chimney 244 and/or vanes 248 direct emissions from the exhaust system upwardly, and generally transverse to aircraft longitudinal axis, L.

Figure 9:
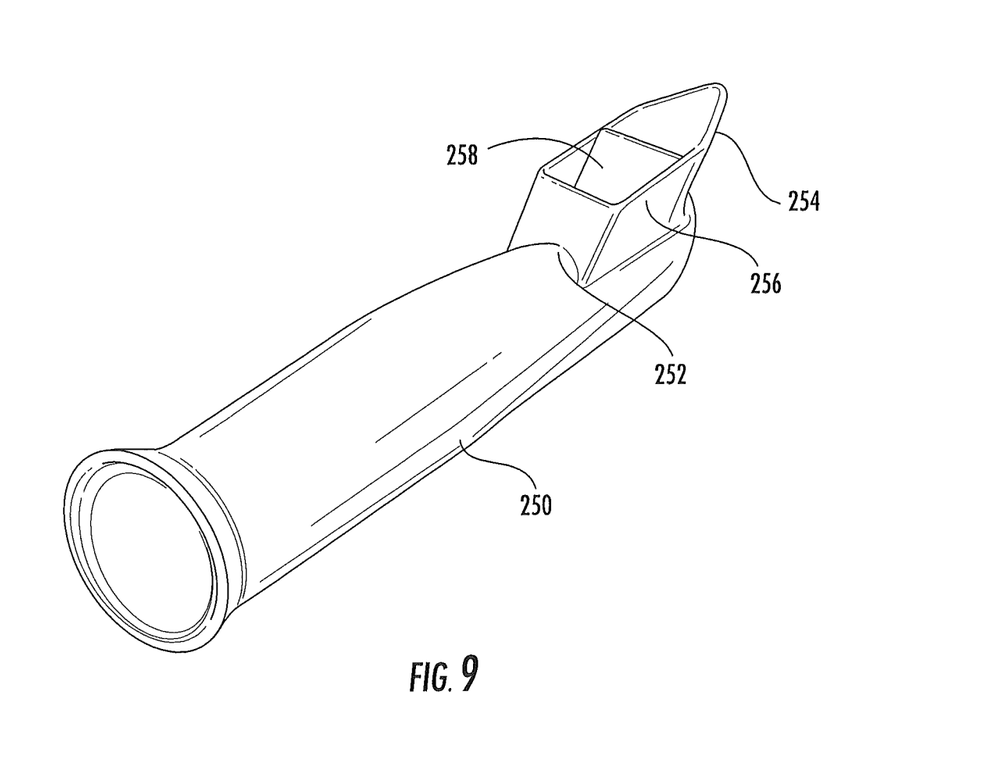
FIG. 9 depicts a single chimney exhaust system in an exemplary embodiment.

FIG. 9 depicts an exhaust manifold 250 in an exemplary embodiment. Exhaust manifold 250 is a generally tubular and tapers in diameter from the fore end of manifold 250 to the aft end of manifold 250. The longitudinal axis of manifold 250 is substantially parallel to longitudinal axis L of the aircraft frame 14. Manifold 250 has an opening 252 in a top side of manifold 250. Opening 252 faces upwards, or in the direction of rotor blades 20. Chimney 254 has walls 256 that circumscribe opening 252. Vanes 258 are positioned in between walls 256 and are spaced and angled relative to axis L to direct emissions of the exhaust system away from the aircraft 10. Opening 252 in manifold 250 is reduced in size and located at the aft end of manifold 250. This concentrates emissions from exhaust manifold 250 towards the rear of aircraft 10. The configuration of the opening 252, chimney 254 and/or vanes 258 direct emissions from the exhaust system upwardly, and generally transverse to aircraft longitudinal axis, L.

Exhaust manifolds 100, 101, 230, 240 and 250 may all be used with internal mixer assembly 102. As described above, exhaust enters the mixer assembly 102 and is mixed with secondary air flow by mixer assembly 102. The mixed exhaust and secondary air is emitted out the chimney of the exhaust manifold.

Figure 10:
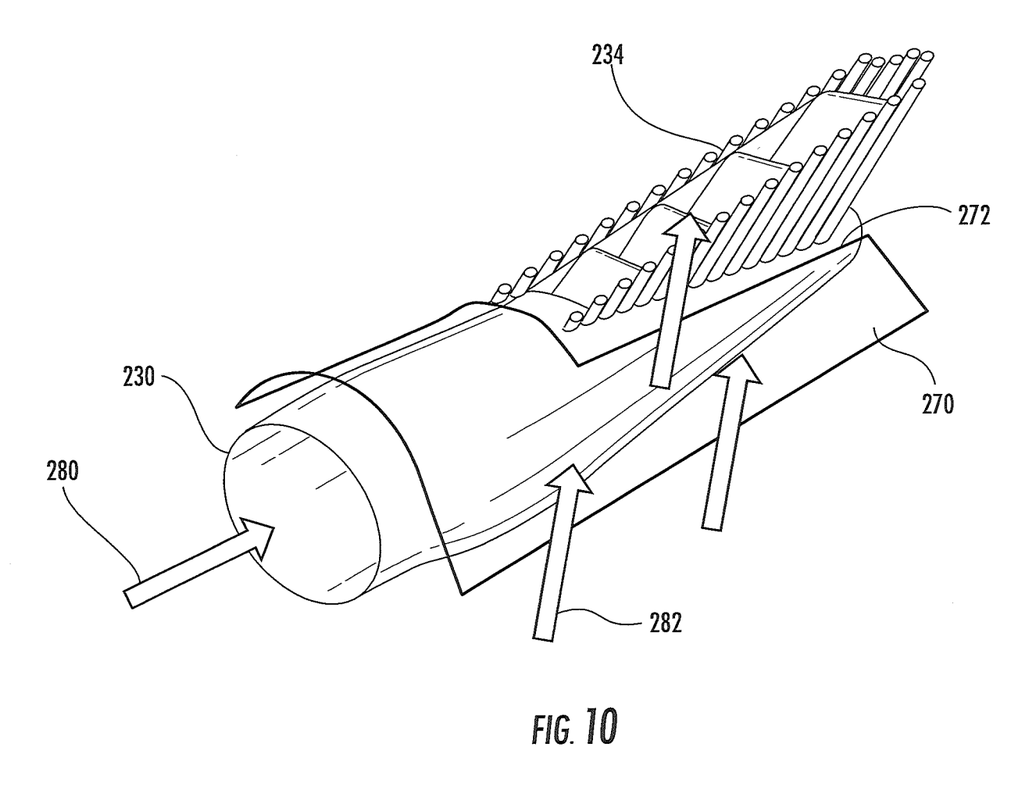
FIG. 10 depicts an external mixing system in an exemplary embodiment.

Exhaust manifolds 100, 101, 230, 240 and 250 may also be used as an external mixer, without the use of mixer assembly 102 in the interior of the manifold. FIG. 10 depicts an example of exhaust manifold 230 in an external mixing embodiment. Exhaust manifold 230 is positioned in a mixing compartment 270. The mixing compartment 270 may be defined by the aircraft exterior fuselage. Alternatively, the mixing compartment may be a structure internal to the aircraft exterior fuselage. Mixing compartment 270 surrounds exhaust manifold 230 and includes an opening 272 aligned with chimney 234.

In operation, exhaust 280 from engine E is fed into the interior of exhaust manifold 230. As described above, the exhaust manifold 230 may be connected to an opening in the firewall to receive exhaust. Secondary air 282 is received in the mixing compartment 270 exterior to exhaust manifold 230. As described herein, the secondary air may be provided by a variety of sources. Secondary air 282 flows along the exterior of manifold 230 and upwards through opening 272 along the outside of chimney 234. The exhaust 280 flows through the interior of manifolds 230 and upwards through the interior of chimney 234. The exhaust 280 and secondary air 282 is mixed at the chimney 234 prior to emission from the exhaust system. Chimney 234 includes lobes to enhance mixing. Any of exhaust manifolds 100, 101, 230, 240 and 250 may be used for external mixing as shown in FIG. 10.

In alternate embodiments, both an internal mixer assembly 102 and an external mixing compartment 270 are used in the exhaust system. Any of exhaust manifolds 100, 101, 230, 240 and 250 may be used for combined internal mixing through mixer assembly 102 and external mixing as shown in FIG. 10.

As discussed above, the sources of secondary air include engine compartment cooling air, IPS air and avionics cooling air. Other internal sources of secondary air include transmission cooling air, hydraulics cooling air, environmental control system (ECS) air and auxiliary power unit (APU) air. The use of internal air sources as the source for the secondary air provides several benefits. Existing aircraft incur significant weight, momentum drag and susceptibility penalties for multiple inlets and exhausts required to support independent cooling of multiple heat sources, including engine, avionics, transmission, hydraulic, environmental control system (ECS) and auxiliary power unit (APU) components. To support the low drag and low weight objectives, embodiments of the invention employ an internally linked thermal management architecture to harness the cooling potential of secondary airflow for primary exhaust cooling. Potential secondary air sources include engine compartment cooling, IPS exhaust, avionics cooling air, transmission oil cooler exhaust, hydraulic oil cooler exhaust, ECS exhaust, and APU exhaust.

Figure 11:
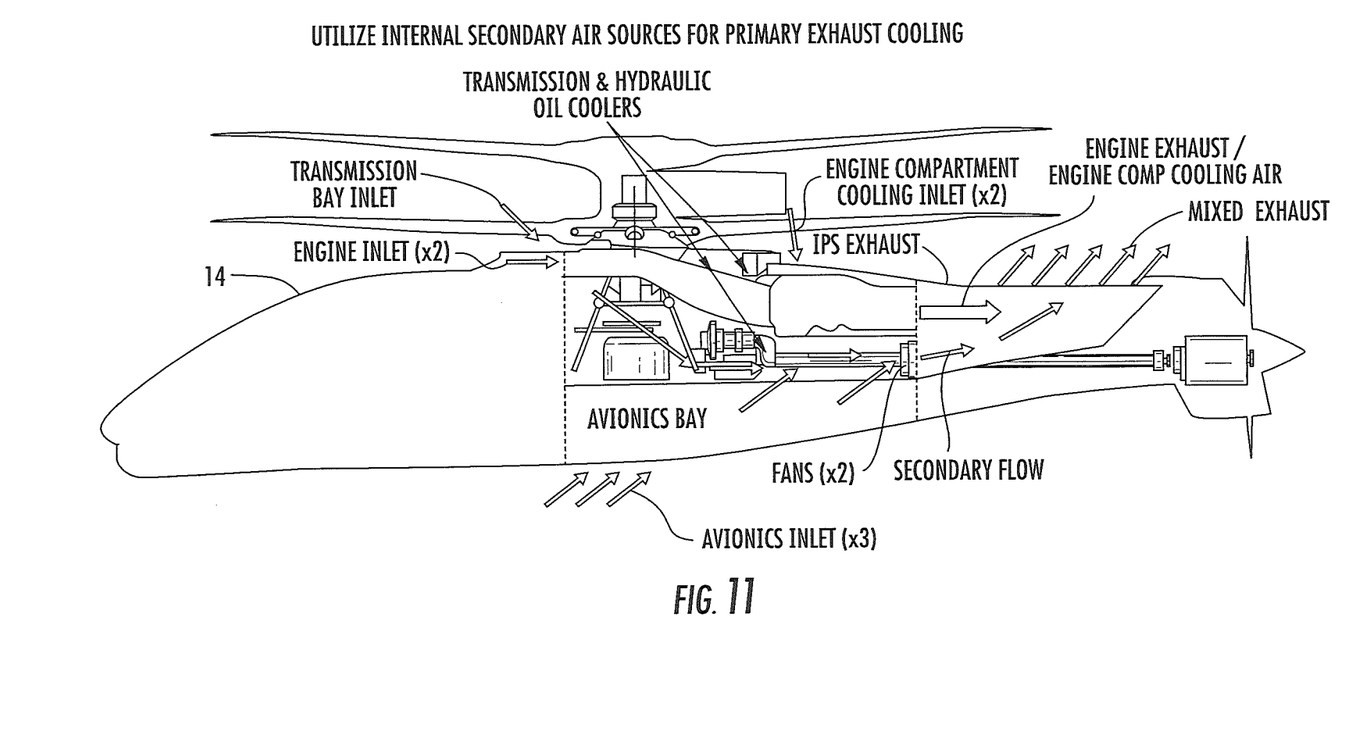
FIG. 11 depicts flow of multiple secondary air sources through an airframe in an exemplary embodiment.

FIG. 11 depicts the flow a multiple secondary air sources through the airframe 14 in an exemplary embodiment. The secondary air is drawn from internal compartments and then mixed with the exhaust from engine E at the exhaust system as described above. Using secondary air from compartments of the airframe 14 reduces or eliminates the need for additional inlets and exhausts, scoops, air rams, etc. This reduces drag on the aircraft and lessens aircraft weight.

Embodiments of the invention provide an exhaust system that results in lower external fuselage impingement temperatures and improved plume attenuation for lower infrared signatures. The configuration of the exhaust manifold openings, chimneys and/or vanes direct emissions from the exhaust system upwardly, and generally transverse to aircraft longitudinal axis, L.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An exhaust system for reducing infrared emissions of a rotary wing aircraft, the exhaust system comprising:
   a manifold;
   a mixer assembly including an exhaust inlet for receiving engine exhaust directly from an engine and a mixer configured to intermix secondary air and the engine exhaust, the mixer assembly being in fluid communication with the manifold such that the intermixed engine exhaust and secondary air is ejected into an interior of the manifold;
   an opening in the manifold, the opening configured to face upwards and away from the rotary wing aircraft; and
   a chimney including a wall positioned about the opening, the chimney configured to eject an emission of intermixed secondary air and engine exhaust upwards and away from the rotary wing aircraft.

2. The exhaust system of claim 1 further comprising:
   a vane positioned in the chimney, the vane angled to eject the emission of intermixed secondary air and engine exhaust upwards and away from the rotary wing aircraft.

3. The exhaust system of claim 1 wherein:
   the manifold includes two openings;
   the chimney includes two chimneys, each chimney configured to eject an emission of intermixed secondary air and engine exhaust upwards and away from the rotary wing aircraft.

4. The exhaust system of claim 1 wherein:
   a source of the secondary air includes at least one of engine compartment cooling air, inlet particle separator exhaust air, avionics cooling air, transmission oil cooler exhaust, hydraulic oil cooler exhaust, environmental control system exhaust, and auxiliary power unit exhaust.

5. The exhaust system of claim 1 further comprising:
   a mixing compartment positioned about the manifold, the mixing compartment having a mixing compartment opening positioned about the chimney, the mixing compartment spaced from the manifold to provide a path for the secondary air along an exterior of the manifold.

6. The exhaust system of claim 1 wherein:
   the wall of the chimney includes inward lobes and outward lobes.

7. The exhaust system of claim 6 wherein:
   the wall of the chimney includes gaps.

8. The exhaust system of claim 1 wherein the mixer includes a plurality of lobes for intermixing the secondary air and the engine exhaust.

9. The exhaust system of claim 8 wherein:
   the mixer assembly includes a mixer base coupled to the exhaust inlet and a plurality of lobes extending from the mixer base, the lobes including outward lobes and inward lobes, the outward lobes directing engine exhaust from an interior of the mixer away from a central axis of the mixer, the inward lobes directing secondary air from an exterior of the mixer towards the central axis of the mixer.

10. The exhaust system of claim 9 wherein:
    the outward lobes and inward lobes alternate around the circumference of the mixer.

11. A rotary wing aircraft comprising:
    a rotor having a plurality of rotor blades;
    an engine for driving the rotor;
    an exhaust system for reducing infrared emissions of the rotary wing aircraft, the exhaust system including:
      a manifold;
      a mixer assembly including an exhaust inlet for receiving engine exhaust directly from the engine and a mixer configured to intermix secondary air and the engine exhaust, the mixer assembly being in fluid communication with the manifold such that the intermixed engine exhaust and secondary air is ejected into an interior of the manifold;
      an opening in the manifold, the opening facing upwards and away from the rotary wing aircraft; and
      a chimney including a wall positioned about the opening, the chimney configured to eject an emission of intermixed secondary air and engine exhaust upwards and away from the rotary wing aircraft.

12. The rotary wing aircraft of claim 11 further comprising:
    a vane positioned in the chimney, the vane angled to eject the emission of intermixed secondary air and engine exhaust upwards and away from the rotary wing aircraft.

13. The rotary wing aircraft of claim 11 wherein:
    the manifold includes two openings;
    the chimney includes two chimneys, each chimney configured to eject an emission of intermixed secondary air and engine exhaust upwards and away from the rotary wing aircraft.

14. The rotary wing aircraft of claim 11 wherein:
    a source of the secondary air includes at least one of engine compartment cooling air, inlet particle separator exhaust air, avionics cooling air, transmission oil cooler exhaust, hydraulic oil cooler exhaust, environmental control system exhaust, and auxiliary power unit exhaust.

15. The rotary wing aircraft of claim 11 further comprising:
    a mixing compartment positioned about the manifold, the mixing compartment having a mixing compartment opening positioned about the chimney, the mixing compartment spaced from the manifold to provide a path for the secondary air along an exterior of the manifold.

16. The rotary wing aircraft of claim 11 wherein:
    the wall of the chimney includes inward lobes and outward lobes.

17. The rotary wing aircraft of claim 16 wherein:
    the wall of the chimney includes gaps.

18. The rotary wing aircraft of claim 11 wherein the mixer includes a plurality of lobes for intermixing the secondary air and the engine exhaust.

19. The rotary wing aircraft of claim 18 wherein:
    the mixer assembly includes a mixer base coupled to the exhaust inlet and a plurality of lobes extending from the mixer base, the lobes including outward lobes and inward lobes, the outward lobes directing engine exhaust from an interior of the mixer away from a central axis of the mixer, the inward lobes directing secondary air from an exterior of the mixer towards the central axis of the mixer.

20. A rotary wing aircraft comprising:
a rotor having a plurality of rotor blades;
an engine for driving the rotor;
an exhaust system for reducing infrared emissions of the rotary wing aircraft, the exhaust system including:
a manifold;
a mixer assembly including an exhaust inlet for receiving engine exhaust directly from the engine and a mixer configured to intermix secondary air and the engine exhaust, the mixer assembly being in fluid communication with the manifold such that the intermixed engine exhaust and secondary air is ejected into an interior of the manifold;
an opening in the manifold, the opening facing upwards and away from the rotary wing aircraft; and
a chimney configured to eject an emission of intermixed secondary air and engine exhaust upwards and away from the rotary wing aircraft;
wherein a source of the secondary air includes at least one of engine compartment cooling air, inlet particle separator exhaust air, avionics cooling air, transmission oil cooler exhaust, hydraulic oil cooler exhaust, environmental control system exhaust, and auxiliary power unit exhaust.

* * * * *